(12) United States Patent
Christiansen et al.

(10) Patent No.: US 6,890,570 B2
(45) Date of Patent: May 10, 2005

(54) PREPARATION OF BAKED PRODUCT FROM DOUGH

(75) Inventors: Luise Christiansen, Kobenhavn (DK); Gitte Budolfsen, Frederiksberg (DK)

(73) Assignee: Novozymes A/S, Bagsvaerd (DK)

( * ) Notice: Subject to any disclaimer, the term of this patent is extended or adjusted under 35 U.S.C. 154(b) by 117 days.

(21) Appl. No.: 10/399,088

(22) PCT Filed: Oct. 4, 2001

(86) PCT No.: PCT/DK01/00646

§ 371 (c)(1), (2), (4) Date: Apr. 11, 2003

(87) PCT Pub. No.: WO02/30207

PCT Pub. Date: Apr. 18, 2002

(65) Prior Publication Data

US 2004/0011221 A1 Jan. 22, 2004

Related U.S. Application Data

(60) Provisional application No. 60/241,139, filed on Oct. 17, 2000.

(30) Foreign Application Priority Data

Oct. 12, 2000 (DK) ........................................ 2000 01521

(51) Int. Cl.[7] .................................................. A21D 8/04
(52) U.S. Cl. ........................... 426/20; 426/10; 426/653; 426/551
(58) Field of Search ............................. 426/10, 20, 22, 426/61, 551, 653; 435/190, 233

(56) References Cited

FOREIGN PATENT DOCUMENTS

| WO | WO 95/00636 | 1/1995 |
|---|---|---|
| WO | WO 95/01727 | 1/1995 |
| WO | WO 95/29996 | 11/1995 |
| WO | WO 99/31990 | 7/1999 |
| WO | WO 99/57986 | 11/1999 |

*Primary Examiner*—Keith Hendricks
(74) *Attorney, Agent, or Firm*—Elias Lambiris; Jason Garbell

(57) ABSTRACT

Addition of an oxidase and a protein disulfide isomerase (PDI) to a dough has a syn-ergistic effect on the loaf volume of a baked product made from the dough.

24 Claims, No Drawings

US 6,890,570 B2

PREPARATION OF BAKED PRODUCT FROM DOUGH

CROSS-REFERENCE TO RELATED APPLICATIONS

This application is a 35 U.S.C. 371 national application of PCT/DK01/00646 filed Oct. 4, 2001 (the international application was published under PCT Article 21(2) in English), which claims priority or the benefit under 35 U.S.C. 119 of Danish application no. PA 2000 01521 filed Oct. 12, 2000 and U.S. provisional application No. 60/241,139 filed Oct. 17, 2000, the contents of which are fully incorporated herein by reference.

FIELD OF THE INVENTION

The present invention relates to a process for preparing a baked product made from dough. More particularly, it relates to a process for preparing a baked product with an increased loaf volume.

BACKGROUND OF THE INVENTION

In the preparation of bread and other baked products from dough, it is generally desirable to increase the volume of the baked product.

The prior art discloses the addition to dough of various oxidases which act on a substrate in the dough to form hydrogen peroxide, e.g. to obtain a larger loaf volume. A well known example is glucose oxidase from *Aspergillus niger* which acts on glucose, maltose etc. in the dough.

WO 9500636 discloses the use of a protein disulfide isomerase for strengthening of gluten in bakery or pastry products.

WO 9529996 and WO 9931990 disclose the addition to dough of certain oxidases in combination with a protein disulfide isomerase.

SUMMARY OF THE INVENTION

The inventors have found that the addition of an oxidase and a protein disulfide isomerase (PDI) to a dough has a synergistic effect on the loaf volume of a baked product made from the dough.

Accordingly, the invention provides a process of preparing a baked product by adding a hydrogen peroxide-forming oxidase and a protein disulfide isomerase to a dough, and baking the dough. The oxidase is a hydrogen peroxide-forming oxidase except the following:

a) a glucose oxidase having optimum activity at pH 6–7 and having more than 75% of maximum activity at pH 8, and b) a carbohydrate oxidase which has a higher activity on an oligosaccharide having a degree of polymerization of 2 or higher as a substrate than on the corresponding monosaccharide.

The invention also provides a baking composition for use in the process.

DETAILED DESCRIPTION OF THE INVENTION

Hydrogen Peroxide-forming Oxidase

The following are some examples of oxidases with EC numbers (according to Enzyme Nomenclature): A monosaccharide oxidase such as glucose oxidase (EC 1.1.3.4), hexose oxidase (EC 1.1.3.5), galactose oxidase (EC 1.1.3.9) or Pyranose oxidase (ECb 1.1.3.10). A deaminating oxidase such as L-amino acid oxidase (EC 1.4.3.2), amine oxidase (EC 1.4.3.4).

The oxidase may particularly have optimum activity at pH 4–5.5.

The glucose oxidase may be derived from a strain of *Aspergillus* or *Penicillium*, particularly *A. niger*, *P. notatum*, *P. amagasakiense* or *P. vitale*. The hexose oxidase may be one described in EP 833563. The pyranose oxidase may be one described in WO 9722257, e.g. derived from *Trametes*, particularly *T. hirsuta*. The galactose oxidase may be one described in WO 0050606.

The deaminating oxidase may be one described in WO 9721351, e.g. a benzylamine oxidase derived from *Pichia*, particularly *P. pastoris*.

The glucose oxidase will typically be added in an amount corresponding to 20–1,000 GODU/kg flour, particularly 75–300 GODU/kg (GODU activity unit defined below). For other oxidases, a similar assay may be used by substituting the substrate.

A substrate of the oxidase may already be present in the dough (e.g. glucose or maltose), or it may be added.

Assay for Glucose Oxidase Activity (GODU)

Glucose oxidase oxidizes glucose in the presence of oxygen to form gluconolactone and hydrogen peroxide. This hydrogen peroxide oxidizes ABTS-R (2,2'-azino-di-[ethylbenzthiazoline-6-sulphonate]) in the presence of per-oxidase. This generates a blue-green color which is measured using a photometer at 418 nm.

Reaction conditions are 90 mM glucose, 0.1 M acetate buffer, pH 5.6, incubation temperature 30° C., and reaction time 34 seconds. 1 unit (GODU) is the amount of enzyme which produces 1 $\mu$mole hydrogen peroxide per minute at these conditions.

Protein Disulfide Isomerase (PDI)

The PDI may particularly have optimum activity at pH 4–5.5.

The PDI may be from a mammalian or microbial source, e.g. from yeast or filamentous fungi, such as *Aspergillus*, *Saccharomyces* or *Schizosaccharomyces*, particularly *A. oryzae*, *A. niger*, *Saccharomyces cerevisiae* or *Schizosaccharomyces pombe*.

The PDI will typically be added in an amount of 0.2–50, particularly 1–10 mg/kg flour (calculated as pure enzyme protein).

Dough

The dough generally comprises wheat meal or wheat flour and/or other types of meal, flour or starch such as corn flour, corn starch, rye meal, rye flour, oat flour, oat meal, soy flour, sorghum meal, sorghum flour, potato meal, potato flour or potato starch.

The dough may be fresh, frozen or par-baked.

The dough is typically leavened e.g. by adding chemical leavening agents or yeast, usually *Saccharomyces cerevisiae* (baker's yeast).

The dough may be a laminated dough.

The dough may also comprise other conventional dough ingredients, e.g.: proteins, such as milk powder, gluten, and soy; eggs (either whole eggs, egg yolks or egg whites); an oxidant such as ascorbic acid, potassium bromate, potassium iodate, azodicarbonamide (ADA) or ammonium persulfate; an amino acid such as L-cysteine; a sugar; a salt such as sodium chloride, calcium acetate, sodium sulfate or calcium sulfate. The dough may comprise fat (triglyceride) such as granulated fat or shortening. The dough may further comprise an emulsifier such as a monoglyceride.

Baked Product

The process of the invention may be used for any kind of baked product prepared from dough, either of a soft or a crisp character, either of a white, light or dark type.

Examples are bread (in particular white, whole-meal or rye bread), typically in the form of loaves or rolls, French baguette-type bread, pita bread, tortillas, cakes, pancakes, biscuits, cookies, pie crusts, crisp bread, steamed bread, pizza and the like.

Baking Composition

The baking composition comprises an oxidase, a PDI and optionally an additional enzyme as described below.

The baking composition may be an enzyme preparation, e.g. in the form of a granulate or agglomerated powder. It may have a narrow particle size distribution with more than 95% (by weight) of the particles in the range from 25 to 500 μm. Granulates and agglomerated powders may be prepared by conventional methods, e.g. by spraying the amylase onto a carrier in a fluid-bed granulator. The carrier may consist of particulate cores having a suitable particle size. The carrier may be soluble or insoluble, e.g. a salt (such as NaCl or sodium sulfate), a sugar (such as sucrose or lactose), a sugar alcohol (such as sorbitol), starch, rice, corn grits, or soy.

The baking composition may, in addition to enzymes, comprise other baking ingredients, particularly flour. Thus, the composition may be a dough or a flour pre-mix.

Additional Enzyme

Optionally, an additional enzyme may be used together with the PDI and the oxidase.

The additional enzyme may be an amylase, a cyclodextrin glucanotransferase, a peptidase, in particular an exopeptidase, a transglutaminase, a lipase, a phospholipase, a cellulase, a hemicelluase, a protease, a glycosyltransferase, a branching enzyme (1,4-α-glucan branching enzyme) or a second oxidoreductase (in addition to the hydrogen peroxide-forming oxidase).

The additional enzyme may be of any origin, including mammalian and plant, and preferably of microbial (bacterial, yeast or fungal) origin.

The amylase may be fungal or bacterial, e.g. a maltogenic alpha-amylase from *B. stearothermophilus* or an alpha-amylase from Bacillus, e.g. *B. licheniformis* or *B. amyloliquefaciens*, a beta-amylase, e.g. from plant (e.g. soy bean) or from microbial sources (e.g. *Bacillus*), a glucoamylase, e.g. from *A. niger*, or a fungal alpha-amylase, e.g. from *A. oryzae*.

The hemicellulase may be a pentosanase, e.g. a xylanase which may be of microbial origin, e.g. derived from a bacterium or fungus, such as a strain of *Aspergillus*, in particular of *A. aculeatus, A. niger, A. awamori*, or *A. tubigensis*, from a strain of Trichoderma, e.g. *T. reesei*, or from a strain of *Humicola*, e.g. *H. insolens*.

The protease may be from *Bacillus*, e.g. *B. amyloliquefaciens*.

The lipase may be derived from a strain of *Thermomyces (Humicola), Rhizomucor, Candida, Aspergillus, Rhizopus,* or *Pseudomonas*, in particular from *T. lanuginosus (H. ianuginosa), Rhizomucor miehei, C. antarctica, A niger, Rhizopus delemar, Rhizopus arrhizus* or *P. cepacia*.

The phospholipase may have phospholipase A1 or A2 or lysophospholipase activity; it may or may not have lipase activity. It may be of animal origin, e.g. from pancreas, snake venom or bee venom, or it may be of microbial origin, e.g. from filamentous fungi, yeast or bacteria, such as *Aspergillus* or *Fusarium*, e.g. *A. niger, A. oryzae* or *F. oxysporum*. Also the variants described in WO 0032578 may be used.

The second oxidoreductase may be a peroxidase, a laccase or a lipoxygenase.

EXAMPLES

Example 1

Bread was made according to a micro scale baking system using 12 g meneba flour per dough. Ascorbic acid (30 ppm), fungal alpha-amylase (Fungamyl at 10 FAU/kg flour), and xylanase (100 FXU/kg flour) were added to each dough.

Baking were made with and without addition of PDI and glucose oxidase to the dough, as indicated below. The glucose oxidase was from *Aspergillus niger*, and the PDI was a variant derived from *Aspergillus*. The volume of each loaf was measured and is expressed as specific volume.

|  | PDI dosage mg enzyme protein/kg flour | Glucose oxidase dosage GODU/kg flour | Specific volume ml/g |
| --- | --- | --- | --- |
| Control | 0 | 0 | 3.6 ± 0.2 |
| Reference | 2.5 | 0 | 3.3 ± 0.1 |
|  | 5 | 0 | 3.8 ± 0.1 |
|  | 0 | 200 | 3.8 ± 0.2 |
| Invention | 2.5 | 200 | 4.0 ± 0.1 |
|  | 5 | 200 | 4.3 ± 0.1 |

The results show that the volume improvement obtained with the combination of glucose oxidase and PDI compared to the control was higher than the sum of the volume improvement obtained with either of the enzymes alone.

What is claimed is:

1. A process of preparing a baked product comprising:
   (a) adding to a dough
      (i) a hydrogen peroxide-forming oxidase and
      (ii) a protein disulfide isomerase,
      wherein a glucose oxidase having optimum activity at pH 6–7 and having more than 75% of maximum activity at pH 8, or a carbohydrate oxidase having a higher activity on an oligosaccharide having a degree of polymerization of 2 or higher as a substrate than on the corresponding monosaccharide, is not added to the dough, and
   (b) baking the dough.

2. The process of claim 1, wherein the oxidase of said i) has optimum activity at pH 4–5.5.

3. The process of claim 1, wherein the oxidase of said i) is a glucose oxidase.

4. The process of claim 2, wherein the oxidase is a glucose oxidase.

5. The-process of claim 1, wherein the oxidase of said i) is derived from *Aspergillus niger*.

6. The process of claim 2, wherein the oxidase is derived from *Aspergillus niger*.

7. The process of claim 1, wherein the protein disulfide isomerase is derived from *Aspergillus*.

8. The process of claim 1, wherein the protein disulfide isomerase is derived from *Aspergillus niger* or *Aspergillus oryzae*.

9. A baking composition comprising:
   (i) a hydrogen peroxide-forming oxidase; and
   (ii) a protein disulfide isomerase, wherein the baking composition does not comprise a glucose oxidase having optimum activity at pH 6–7 and having more than 75 % of maximum activity at pH 8 or a carbohydrate oxidase having a higher activity on an oligosaccharide having a degree of polymerization of 2 or higher as a substrate than on the corresponding monosaccharide.

10. The composition claim 9, wherein the oxidase of said i) has optimum activity at pH 4–5.5.

11. The composition of claim 9, which further comprises flour.

12. The composition of claim 10, which further comprises flour.

13. The composition of claim 9, which is a dough, a flour composition, or a flour pre-mix.

14. The composition of claim 10, which is a dough, a flour composition, or a flour pre-mix.

15. The composition of claim 9, wherein the oxidase of said i) is a glucose oxidase.

16. The composition of claim 10, wherein the oxidase is a glucose oxidase.

17. The composition of claim 9, wherein the oxidase of said i) is derived from *Aspergillus niger*.

18. The composition of claim 10, wherein the oxidase is derived from *Aspergillus niger*.

19. The composition of claim 9, wherein the protein disulfide isomerase is derived from *Aspergillus*.

20. The composition of claim 9, wherein the protein disulfide isomerase is derived from *Asperillus niger* or *Aspergillus oryzae*.

21. A process of preparing a baked product comprising:
 a) adding to a dough
  (i) a glucose oxidase which has optimum activity at pH 4–5.5 and which has a higher activity on a monosaccharide as a substrate than on an oligosaccharide having a degree of polymerization of 2 or higher; and
  (ii) a protein disulfide isomerase, and
 b) baking the dough.

22. The process of claim 21, wherein the glucose oxidase is derived from *Aspergillus niger*.

23. A baking composition comprising:
 (i) a glucose oxidase which has optimum activity at pH 4–5.5 and which has a higher activity on a monosaccharide as a substrate than on an oligosaccharide having a degree of polymerization of 2 or higher; and
 (ii) a protein disulfide isomerase.

24. The composition of claim 23, wherein the glucose oxidase is derived from *Aspergillus niger*.

\* \* \* \* \*